United States Patent
Lee et al.

(10) Patent No.: US 11,201,768 B1
(45) Date of Patent: Dec. 14, 2021

(54) METHOD AND APPARATUS FOR MULTI-LEVEL SIGNALING ADAPTATION WITH FIXED REFERENCE LEVELS

(71) Applicant: SEOUL NATIONAL UNIVERSITY R&DB FOUNDATION, Seoul (KR)

(72) Inventors: Woonghee Lee, Seoul (KR); Minkyo Shim, Seoul (KR); Yunhee Lee, Seoul (KR); Deog-Kyoon Jeong, Seoul (KR)

(73) Assignee: Seoul National University R&DB Foundation, Seoul (KR)

( * ) Notice: Subject to any disclaimer, the term of this patent is extended or adjusted under 35 U.S.C. 154(b) by 0 days.

(21) Appl. No.: 17/183,648

(22) Filed: Feb. 24, 2021

(51) Int. Cl.
*H04L 25/49* (2006.01)
*H04L 7/033* (2006.01)

(52) U.S. Cl.
CPC ........ *H04L 25/4917* (2013.01); *H04L 7/0334* (2013.01)

(58) Field of Classification Search
CPC .......................... H04L 25/4917; H04L 7/0334
See application file for complete search history.

(56) References Cited

U.S. PATENT DOCUMENTS 7,167,527 B1 * 1/2007 Park .................. H04L 25/4917
375/286

OTHER PUBLICATIONS

M. J. E. Lee, et al., "Low-power area-efficient high-speed I/O circuit techniques," IEEE Journal of Solid-State Circuits, vol. 35, No. 11, pp. 1591-1599, Nov. 2000.
P. Peng, et al., "A 56Gb/s PAM-4/NRZ Transceiver in 40nm CMOS," IEEE International Solid-State Circuits Conference, pp. 110-111, Feb. 2017.
V. Stojanovic, et al., "Autonomous Dual-Mode (PAM2/4) Serial Link Transceiver With Adaptive Equalization and Data Recovery," IEEE Journal of Solid-State Circuits, vol. 40, No. 4, Apr. 2005.

* cited by examiner

*Primary Examiner* — Nader Bolourchi
(74) *Attorney, Agent, or Firm* — Rabin & Berdo, P.C.

(57) ABSTRACT

The present disclosure relates to an adaptation method for data level (dLev) or data swing detection in a high-speed link system for multi-level (e.g. PAM-4) signaling. Provided are a receiver and a receiving method in which when a swing range of data received as an input is changed according to a channel condition, reference levels of data/swing detection samplers are not adaptively controlled, but the reference levels are fixed and a variable gain amplifier (VGA) is adaptively controlled for response to the change. Through the present disclosure, offset calibration of the data/swing detection samplers is more accurately performed and lower bit error rate (BER) is thus achieved.

14 Claims, 13 Drawing Sheets

Ready to receive data

Prior Art

(b) SAMPLER OFFSET DEPENDING ON THE REFERENCE VOLTAGE (a) SAMPLER SCHEMATIC DIAGRAM (Prior Art)

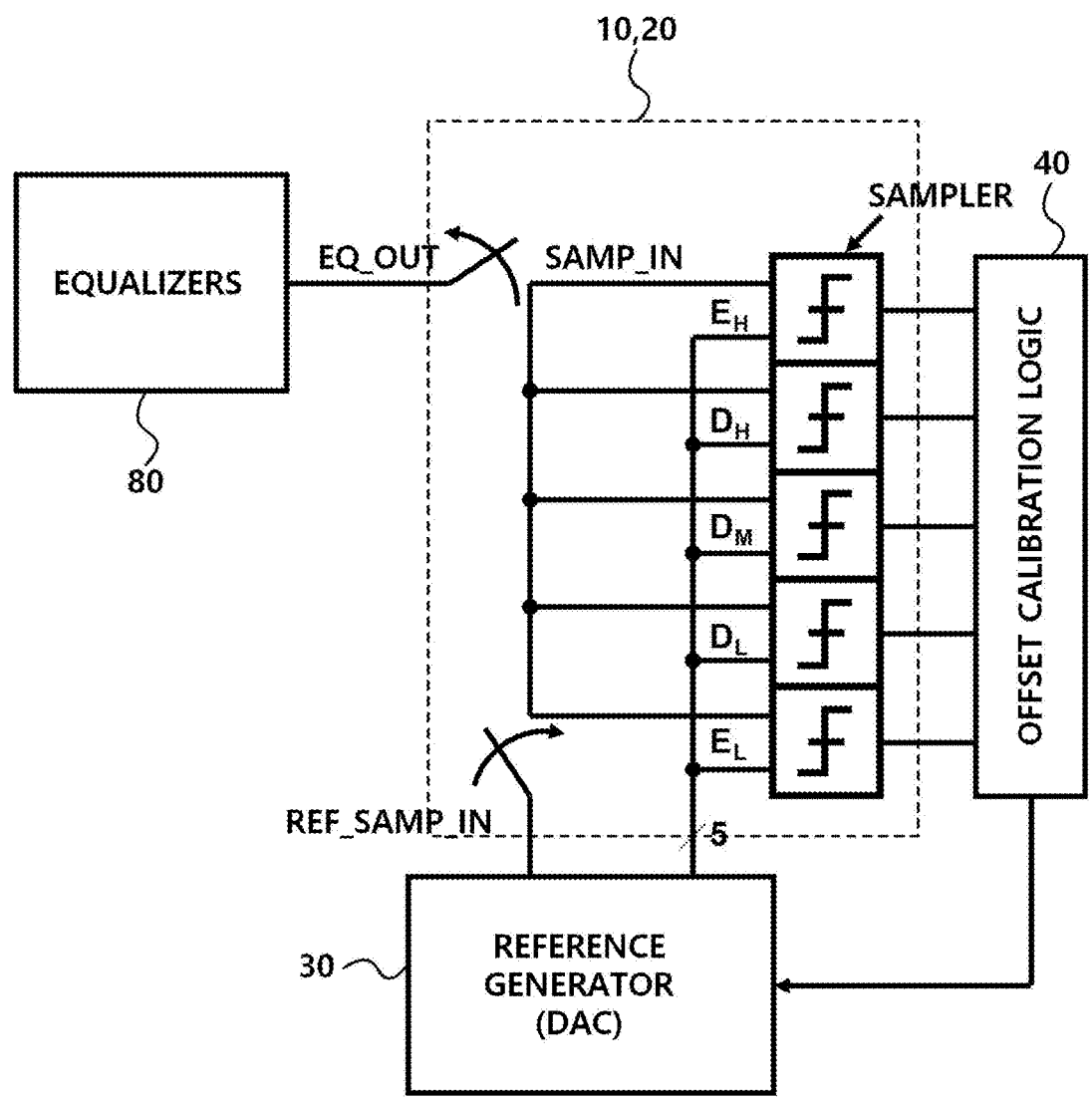

FIG. 9A
FIG. 9B
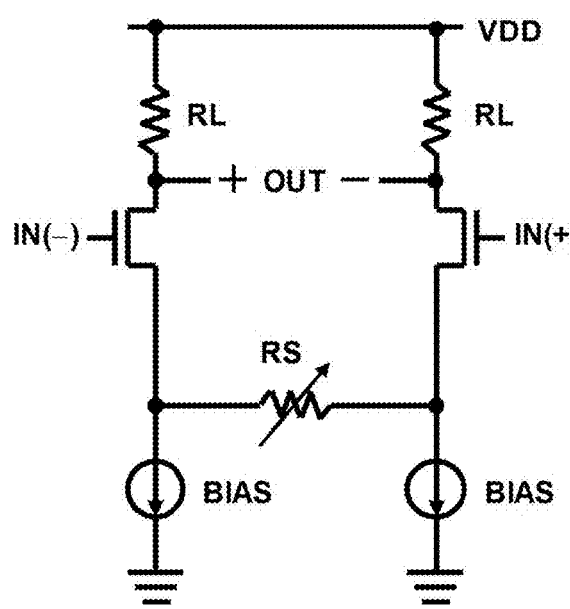
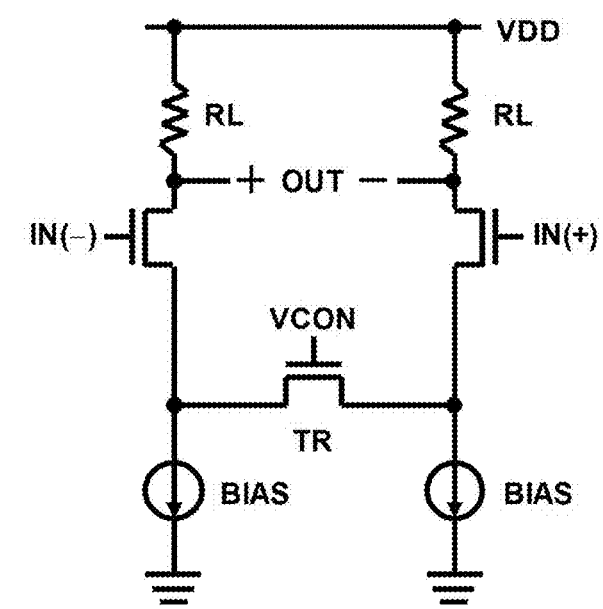
(a) USING PASSIVE RESISTOR
(b) USING LINEAR REGION OF TRANSISTOR (a) CASE OF IDEAL PAM-4 LINEARITY $D_H, D_M, D_L = ?$ (b) CASE OF NON-IDEAL PAM-4 LINEARITY (a) EXAMPLE OF TRANINIG PATTERN (b) PAM-4 EYE AT THE SAMPLER INPUT AND PROBABILITY DURING THE TRANINIG SEQUENCE

METHOD AND APPARATUS FOR MULTI-LEVEL SIGNALING ADAPTATION WITH FIXED REFERENCE LEVELS

BACKGROUND OF THE INVENTION

Field of the Invention

The present disclosure relates to an adaptive receiver and an adaptive receiving method for multi-level signaling.

Description of the Related Art

In a wireline architecture performing optical/electrical data transmission for Internet networking, an increase in data rate is continuously required. In order to satisfy this requirement, an optical/electrical link design also continues to technologically advance through an increase in an operating speed and the number of pin ports.

On the other hand, compared to the increase rate of the data rate needs required in an application, the improvement in a data transmission medium (also known as a channel) has been relatively slow. Therefore, deterioration in signal integrity caused by frequency-dependent distortion such as the skin effect, dielectric loss, and reflection has become more and more of a problem.

As the channel loss becomes a problem due to high Nyquist frequency, multi-level signaling through pulse-amplitude modulation (PAM) is more efficient than a non-return-to-zero (NRZ) method. Therefore, interest in multi-level signaling such as PAM-4, which generates a 4-level 1-symbol on a per-2-bit basis, and applications introducing this have increased.

FIG. 1 is a block diagram illustrating a conceptual architecture of a PAM-4 receiver in the related art. Unlike NRZ, in a PAM-4 system, 2-bit data rather than 1-bit data is converted into four levels for transmission, so three data samplers are used to classify the four levels. Then, 3-bit thermometer data output from the three samplers is converted into a 2-bit binary data code through an analog or digital circuit and reconstruction is performed in a clock and data recovery (CDR) block. For reference, in PAM-4, the number of samplers is inherently large, so baud-rate CDR (e.g. Mueller-Muller CDR) operating at a symbol rate without an edge sampler is usually used rather than 2× oversampling CDR requiring an edge sampler. The baud-rate CDR may use output of a swing detection sampler as well as output of a data sampler in clock recovery.

In the meantime, in order to reduce the bit error rate (BER) in a high-speed data link system, it is important to appropriately set a data reference level for sampling data in a receiver. In a case of using differential signaling, in NRZ, a data threshold level is zero, so a special data reference level is not required.

In PAM-4, however, a threshold of three samplers needs to be determined. Therefore, although differential signaling is used, reference levels corresponding to eyes of upper and lower sides need to be set to values other than DC=0 V. Further, all the values need to be appropriately determined to be values that facilitate the lowest BER.

In a high-speed link system, adaptation logic is usually used in order to respond to various channel characteristics or to a change in characteristics according to a change in time and temperature of channels. Because such a change in characteristics changes input amplitude in a sampler of a receiver, reference levels also need to respond to a change in the input amplitude through adaptive control.

For this adaptation operation, data level adaptation using a swing detection sampler is generally used (Ref. 1. V. Stojanovic, et al., "Autonomous Dual-Mode (PAM2/4) Serial Link Transceiver With Adaptive Equalization and Data Recovery," IEEE Journal of Solid-State Circuits, Vol. 40, No. 4, April 2005, Ref. 2. P. Peng, et al., "A 56 Gb/s PAM-4/NRZ Transceiver in 40 nm CMOS," IEEE International Solid-State Circuits Conference, pp. 110-111, February 2017).

An operation of a conventional method will be described with reference to FIG. 2 illustrating a conceptual operation, in conjunction with FIG. 1. Swing detection samplers further provided sense a change in amplitude of an input signal and output information on whether reference levels $E_H$ and $E_L$ currently applied to the swing detection samplers are higher or lower than the input amplitude. The reference levels are made to increase or decrease depending on whether the output of the sampler is high or low, so that the $E_H$ and $E_L$ levels are made to follow the signal amplitude. In addition, adaptation is completed at the point at which the ratio between high and low outputs of the swing detection samplers is 1:1 (that is, data level values converge).

Reference levels $D_H$, $D_M$, and $D_L$ applied to three data samplers for identifying a PAM-4 signal may be calculated from $E_H$ or $E_L$ or both using the following equations.

In a case of single-ended signaling (Eq. 1)

$$D_H = E_L + 5/6 \times (E_H - E_L)$$

$$D_M = E_L + 1/2 \times (E_H - E_L)$$

$$D_L = E_L + 1/6 \times (E_H - E_L)$$

In a case of differential signaling (Eq. 2)

$$D_H = 2/3 \times E_H$$

$$D_M = 0$$

$$D_L = 2/3 \times E_L$$

FIG. 3 is a flowchart illustrating an operation method in the related art.

When data reference levels are determined, offset cancellation of samplers needs to be considered first. A sampler has a random offset because of device mismatch, etc., which makes an error in a sampling value near a desired reference level. Therefore, before setting a reference level, a random offset of a sampler is detected in advance, and then data level adaptation is performed, with a random offset value of each sampler applied. In a case of data samplers, levels are determined using Eq. 1 or Eq. 2 above rather than adaptation being performed referring to output of the data samplers. Therefore, offset calibration is required for the data samplers.

In order to detect the random offset of the sampler, similarly to Ref. 3. (M. J. E. Lee, et al., "Low-power area-efficient high-speed I/O circuit techniques," IEEE Journal of Solid-State Circuits, Vol. 35, pp. 1591-1599, November 2000), a method as follows is widely used: making a state of a signal to be received as a data input of the sampler into a zero state, and sweeping a reference level near zero and detecting a sampler offset at a point at which the ratio between low and high outputs of the sampler is 1:1. Further, data level adaptation (reference level adaptation) is performed using a swing detection sampler. However, according to the study by the inventor of the present application, there is a problem in applying this method to multi-level signaling as it is, which will be described below with reference to FIGS. 4A and 4B. The following description is a part of a process for the present disclosure and the following description and the graph of FIG. 4B should not be regarded as the related art.

FIG. 4A is a schematic diagram illustrating an example of a sampler. FIG. 4B illustrates a result of a simulation showing how a random offset of a sampler changes depending on a reference level when $v_{th}$ mismatch of 20 mV is applied to transistors M1, M2, and M3 of the sampler.

It was found that the value of the offset may significantly change depending on what reference level the random offset of the sampler operates at. In addition, the dimensions of a transistor that are gradually reduced by an ultra-small semiconductor process are generally likely to cause an increase in the random offset value of a sampler. The ultra-small semiconductor process may further intensify such a change. Therefore, like the methods in the related art, when an offset at the point at which the reference level is 0 is applied to a sampler, such as a data sampler, operating with a reference level other than zero, the BER deteriorates because of the difference with the actual offset.

Although using a method other than the methods in the related art mentioned herein, a random offset of each data sampler is acquired from a value that is assumed to be a reference level ($D_H$ or $D_L$) at which the sampler actually operates, if adaptation for a data level is performed as described above with reference to FIG. 2, a reference level is determined at a different point than an initial reference level with which offset cancellation is performed. Therefore, there is as much offset cancellation error as the reference level is changed, unfortunately resulting in an increase in the BER. As shown in FIG. 4B, at the point where the reference level is as high as 0.2 V, a change in the reference level only by several tens mV causes a change in the offset voltage by several tens mV. This offset cancellation error may be more fatal to a PAM-4 signal with reduced SNR compared to NRZ.

The foregoing is intended merely to aid in the understanding of the background of the present disclosure, and is not intended to mean that the present disclosure falls within the purview of the related art that is already known to those skilled in the art.

SUMMARY OF THE INVENTION

Accordingly, the present disclosure has been made keeping in mind the above problems in the related art, and the present disclosure is directed to providing an adaptive receiver and an adaptive receiving method that are capable of performing data level adaptation and enabling more accurate offset cancellation.

In addition, the present disclosure is directed to providing an adaptive receiver and an adaptive receiving method that are capable of enabling accurate offset cancellation although levels of a multi-level signal to be received are variable.

According to an aspect of the present disclosure, there is provided an adaptive receiving method performed in a receiver for receiving a multi-level signal, wherein the receiver includes multiple data samplers, the adaptive receiving method including: amplifying, at a signal amplification step, a signal that is received through a channel and includes transmission information; detecting, at a swing detection step, a swing of the signal amplified at the signal amplification step, by using one or more swing detection samplers; and controlling, at a feedback control step according to the swing detected at the swing detection step, an amplification factor amplified at the signal amplification step, in order to make the swing of the signal input to the multiple data samplers uniform, wherein while the steps are repeatedly performed, levels of the signal amplified at the signal amplification step are distinguished using the multiple data samplers.

In the adaptive receiving method, during reception of the signal including the transmission information, reference levels for the multiple data samplers and the one or more swing detection samplers may be fixed.

The adaptive receiving method may further include: calibrating, at an offset calibration step, offsets of the multiple data samplers and the one or more swing detection samplers before the signal including the transmission information is received.

In the adaptive receiving method, at the offset calibration step, in each of the multiple data samplers and the one or more swing detection samplers, the offset may be determined using a signal for performing sweeping around a reference level, and a reference level acquired by applying the determined offset may be set for each of the multiple data samplers and the one or more swing detection samplers.

The adaptive receiving method may further include: aligning, at an eye center tracking step, reference levels of the multiple data samplers with eye centers of a reception signal.

In the adaptive receiving method, the eye center tracking step may be performed before a transmitter transmits the signal including the transmission information, and the eye center tracking step may include: an eye center determining process in which when the transmitter transmits a training pattern, the eye centers of the reception signal are determined using a result received by each of the multiple data samplers; and a reference level providing process in which the reference levels of the multiple data samplers are provided according to the determined eye centers.

In the adaptive receiving method, in the training pattern, all symbols may be present with the same probability, and at the eye center determining process, the following may be repeated: when a cumulative average output value of each of the multiple data samplers is higher than a predicted output value, the reference level is increased and when the cumulative average output value is lower than the predicted output value, the reference level is decreased.

According to another aspect of the present disclosure, there is provided an adaptive receiver for multi-level signaling, the adaptive receiver including: a variable gain amplifier amplifying a signal received through a channel; a data sampler block including multiple data samplers in order to classify levels of the signal input through the variable gain amplifier; a swing detection sampler block including one or more swing detection samplers in order to detect a swing of the signal input through the variable gain amplifier; and adaptation logic controlling gain of the variable gain amplifier by using an output of the swing detection sampler block, in order to make the swing of the signal input to the data sampler block uniform even during reception of a signal including transmission information.

The adaptive receiver may further include: a reference generator outputting reference levels for the multiple data samplers and the one or more swing detection samplers.

In the adaptive receiver, the reference levels output by the reference generator may be fixed during reception of the signal including the transmission information.

The adaptive receiver may further include: offset calibration logic providing information on reference levels to a reference generator and performing offset calibration on the reference levels, wherein in a process of performing offset calibration, the reference generator may generate as a signal for performing sweeping around the reference levels and may provide the signal for performing sweeping to the multiple data samplers and the one or more swing detection samplers, and the offset calibration logic may determine offsets and may provide the reference generator with information on reference levels acquired by applying the offsets.

In the adaptive receiver, the variable gain amplifier may be realized as a differential amplifier having a source degeneration resistor, and the gain of the variable gain amplifier may be controlled by varying resistance of the source degeneration resistor.

The adaptive receiver may further include: eye center tracking logic controlling the reference generator in order to align the reference levels of the multiple data samplers with eye centers of a reception signal.

In the adaptive receiver, when a transmitter transmits a training pattern before transmitting the signal including the transmission information, the eye center tracking logic may determine the eye centers of the reception signal by using a result received by each of the multiple data samplers and may provide information on the determined eye centers to the reference generator.

BRIEF DESCRIPTION OF THE DRAWINGS

The above and other objectives, features, and other advantages of the present disclosure will be more clearly understood from the following detailed description when taken in conjunction with the accompanying drawings, in which:

FIG. 8 is a diagram illustrating an example of sampler offset calibration according to the first exemplary embodiment of the present disclosure;

FIGS. 9A and 9B are diagrams illustrating examples of a variable gain amplifier (VGA);

DETAILED DESCRIPTION OF THE INVENTION

Figure 1:
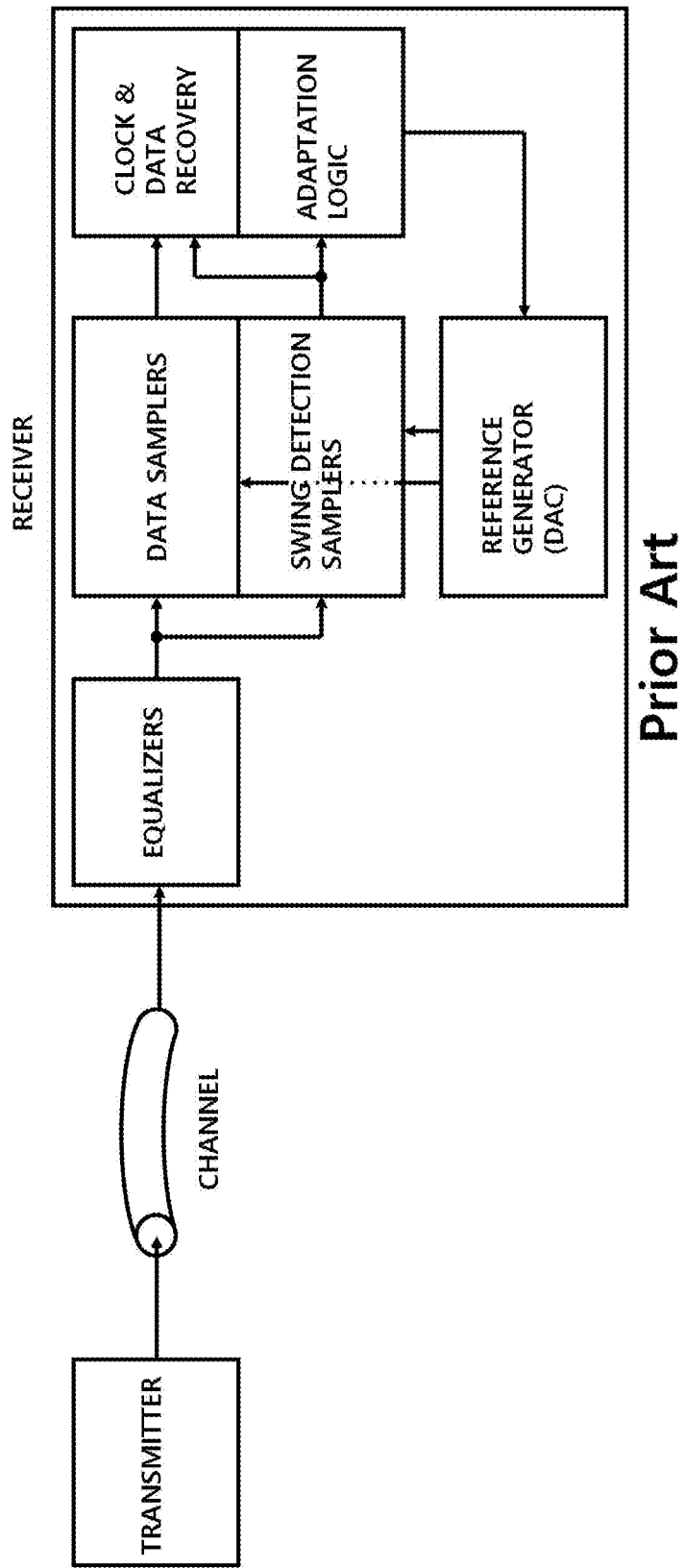
FIG. 1 is a block diagram illustrating a receiver in the related art.
Figure 2:
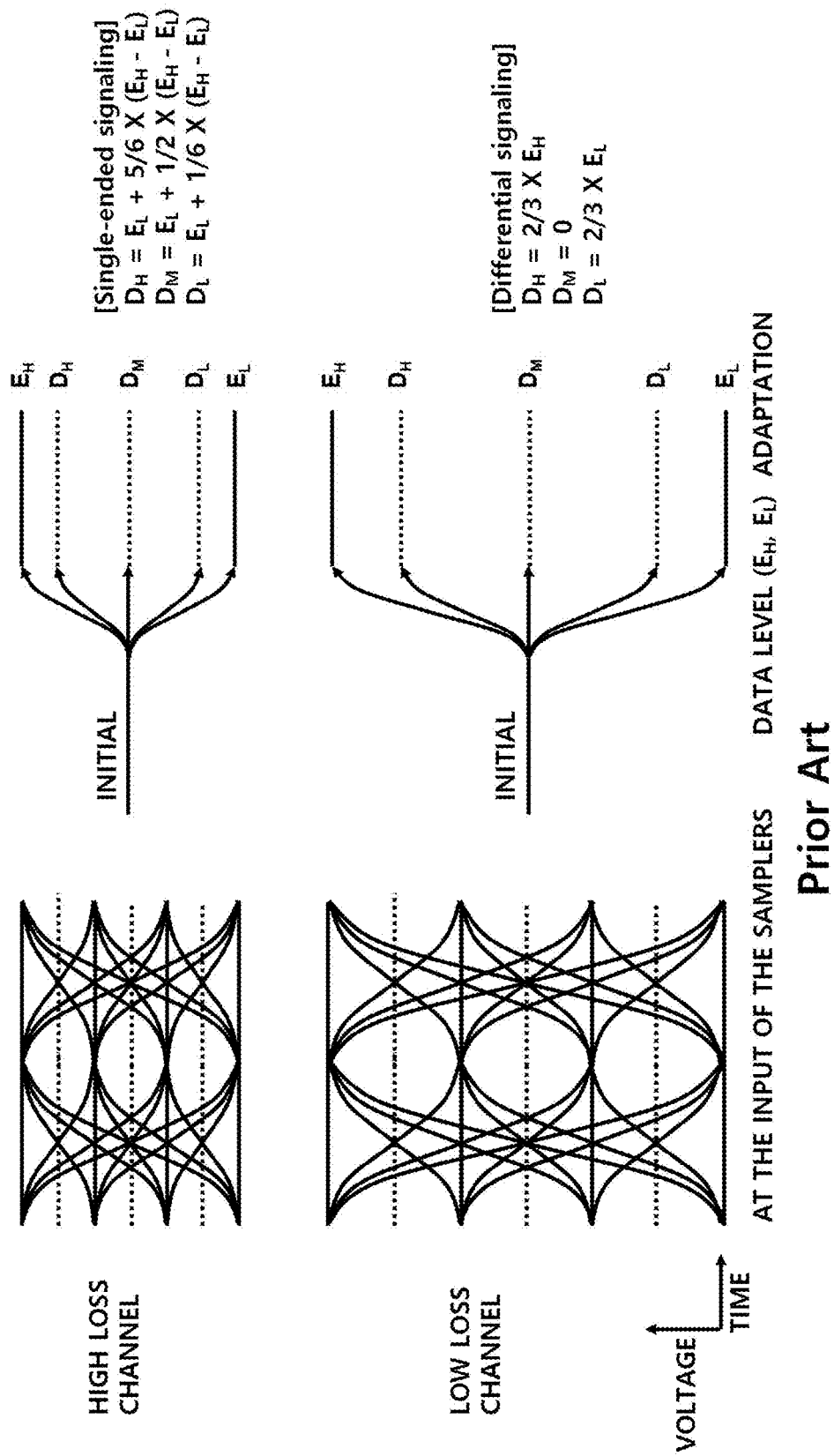
FIG. 2 is a diagram illustrating a conceptual operation in the related art.
Figure 3:
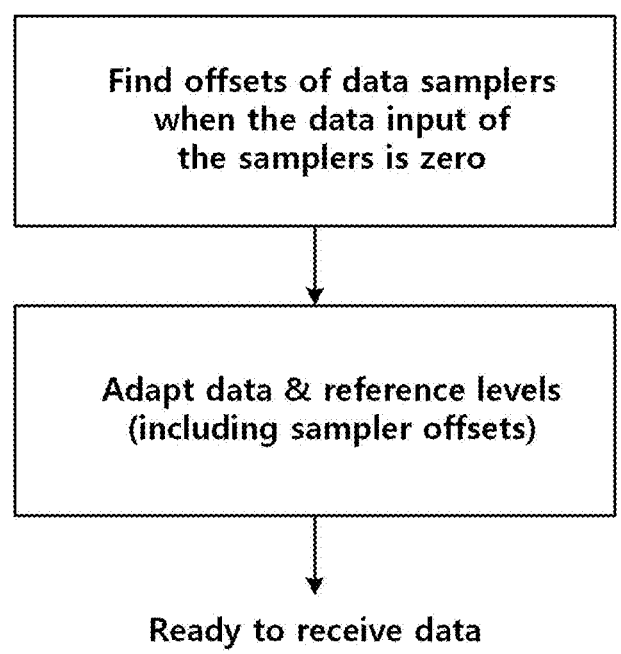
FIG. 3 is a flowchart illustrating an operation method in the related art.

Hereinbelow, exemplary embodiments of the present disclosure will be described in detail with reference to the accompanying drawings. Throughout the drawings, the same reference numerals will refer to the same or like parts.

Although the scope of the present disclosure is not limited to PAM-4, for clear description, PAM-4 among types of multi-level signaling will be described below as an example.

Figure 5:
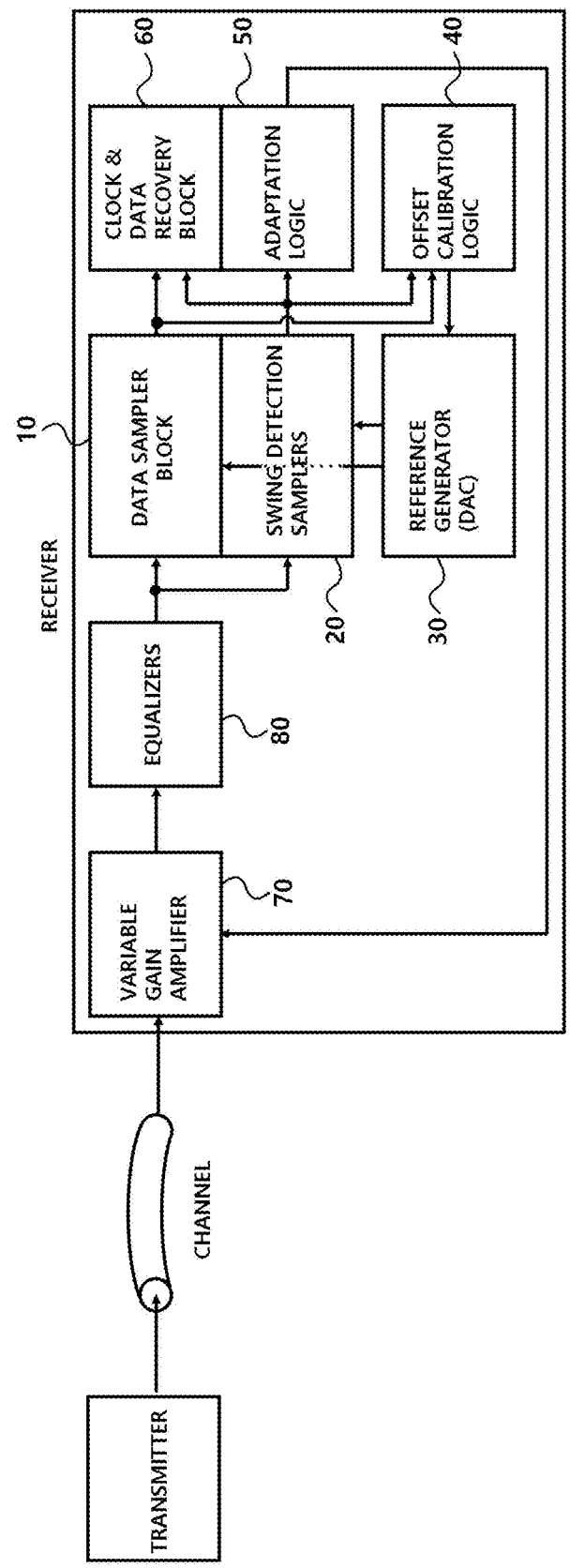
FIG. 5 is a block diagram illustrating a receiver according to a first exemplary embodiment of the present disclosure.

FIG. 5 is a block diagram illustrating a receiver according to a first exemplary embodiment of the present disclosure. Unlike the related art, in the present disclosure, reference levels output from a reference generator 30 for data samplers and swing detection samplers are fixed. Therefore, adaptation logic 50 receives the output of the swing detection samplers, and adjusts an input data swing by controlling gain of a variable gain amplifier 70 instead of controlling the reference generator 30.

The variable gain amplifier 70 amplifies a signal received through a channel and has gain controlled by the adaptation logic 50. The gain-controlled output is provided to equalizers 80, which is connected to the rear end of the variable gain amplifier, and is provided to a data sampler block 10 and a swing detection sampler block 20 accordingly. For example, the variable gain amplifier 70 may be realized as a general differential amplifier having a source degeneration resistor as shown in FIGS. 9A and 9B. In a differential amplifier constructed with current mode logic, a resistor for source degeneration is constructed, and the gain of the variable gain amplifier 70 may be controlled by varying the resistance of the resistor. FIG. 9A shows a case in which degeneration resistance Rs is variable through a passive resistor. FIG. 9B shows a case in which variable resistance is configured using linear region resistance of a transistor TR. Resistance may be changed by adjusting voltage WON of the MOS FET through output of a DAC, which may be advantageous in terms of circuit complexity and area. The equalizers 80 are general elements that perform equalizing on signals.

Figure 4B:
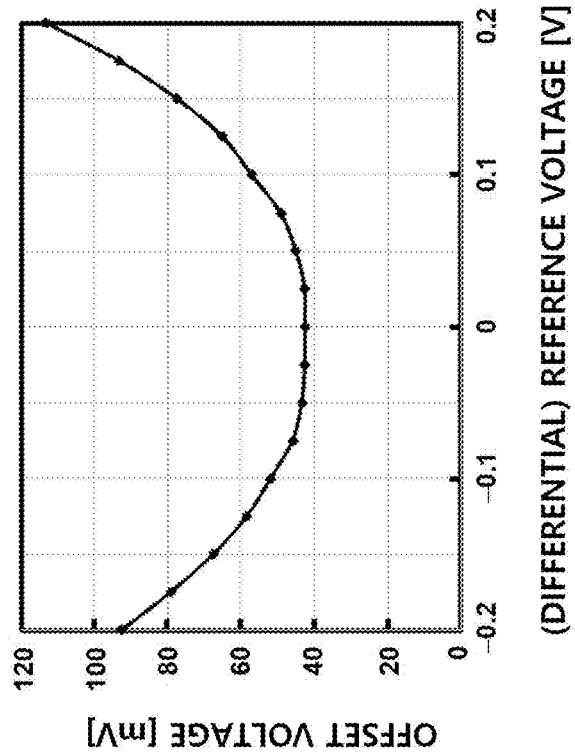
FIGS. 4A and 4B are diagrams illustrating reference level dependency of a sampler offset.
Figure 4A:
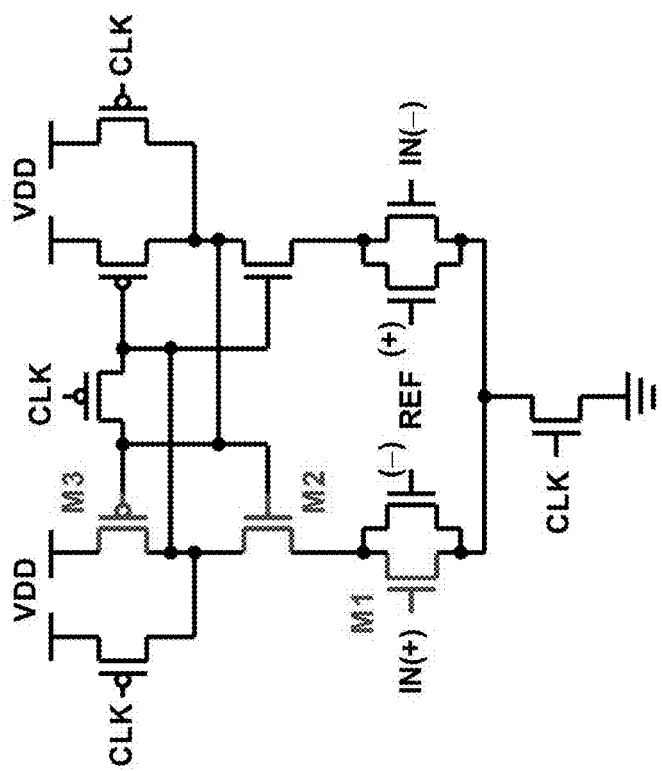

The data sampler block 10 includes multiple data samplers, and classifies levels of a signal input through the variable gain amplifier 70. Herein, reference levels $D_H$, $D_M$, and $D_L$ provided from the reference generator 30 are used. The swing detection sampler block 20 includes one or multiple swing detection samplers, for example, two swing detection samplers, and detects a swing of the signal input through the variable gain amplifier 70. Herein, reference levels $E_H$ and $E_L$ provided from the reference generator 30 are used. As the data samplers and the swing detection samplers, a sampler known in the art may be employed, and the sampler may be configured like the circuit shown in FIG. 4A, for example. In the circuit of FIG. 4A, a reference level is applied through terminals REF(+) and REF(−) among the gates of the MOS FETs, and a data input is applied to IN(+) and IN(−), and a system clock is applied to terminal CLK.

The reference generator 30 outputs reference levels for the multiple data samplers of the data sampler block 10 and the swing detection samplers of the swing detection sampler block 20. Each of the reference levels is controlled by the adaptation logic 50. For example, the reference generator 30 may be realized as a voltage digital-to-analog converter (DAC), and a simple voltage DAC may be realized such that a switch array is connected to a resistor array and the switch array is controlled through a digital control signal. Herein, the digital control signal related to each sampler is provided by offset calibration logic 40.

The offset calibration logic 40 provides information on reference levels to the reference generator 30 and fulfils a leading function in performing offset calibration on the reference levels.

The adaptation logic 50 controls the gain of the variable gain amplifier by using the output of the swing detection sampler block 20 (namely, the swing detection samplers). The reference levels output by the reference generator 30 during reception of a signal including transmission information are fixed, and the adaptation logic 50 controls the gain of the variable gain amplifier 70 so that the swing of the signal input to the data sampler block during reception of the signal including transmission information is made to be uniform. A clock & data recovery block 60 performs functions, such as extracting an appropriate clock from a serial data stream, and so on, and keeps clock synchronization (that is, timing for symbols) accurate for accurate reproduction and reconstruction of an original signal. In addition, a function of converting thermometer data output from the data sampler into a binary data code may be configured at the rear end of the data sampler or at the front end of the clock & data recovery block 60.

Figure 6:
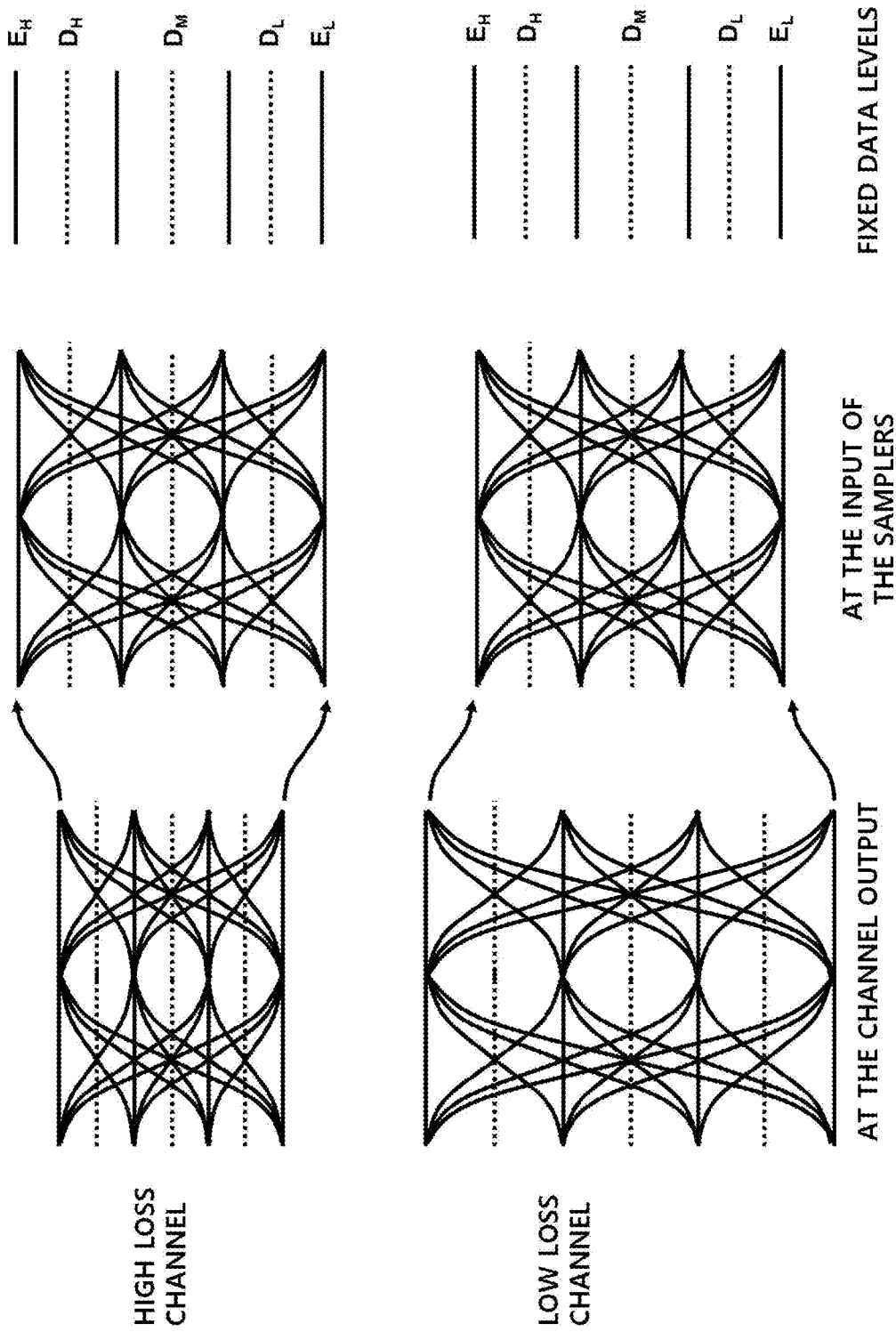
FIG. 6 is a diagram illustrating a conceptual operation according to the first exemplary embodiment of the present disclosure.

FIG. 6 is a conceptual diagram illustrating an adaptation operation according to the present disclosure having fixed reference levels. Even in a case in which amplitudes of signals coming through a high loss channel or a low loss channel differ, fixed reference levels are used in the present disclosure, and adaptation is performed so that a data swing at an input node of the samplers is matched to the fixed reference levels, which are predetermined, through the method of adjusting the gain of the variable gain amplifier 70.

Hereinafter, an adaptive receiving method performed in an adaptive receiver according to the first exemplary embodiment of the present disclosure will be described with reference to FIGS. 5 to 8.

First, data and swing detection reference levels $E_H$, $D_H$, $D_M$, $D_L$, and $E_L$ are determined such that the largest swing is provided within a range that does not severely damage the linearity of a PAM-4 signal, at step S10. Herein, the reason for making the swing large is that in a case of a PAM-4 signal, one eye is inherently a ⅓ size of that of NRZ, so the SNR is low. In addition, the linearity of the signal to be received is determined through the linearity of an analog front-end circuit including a PAM-4 driver of a transmitter and the equalizers 80 of the receiver.

After the desired reference levels $E_H$, $D_H$, $D_M$, $D_L$, $E_L$ are determined, an offset of each sampler is determined at step S12. Before a signal including transmission information is received, offset calibration in which offsets of the data samplers and the swing detection samplers are calibrated is performed. In the related art, an offset is detected while input data of a sampler is set to zero, but in the present disclosure, an offset is detected with a value of the reference level determined at step S10. In each data sampler and each swing detection sampler, an offset is determined using a signal for performing sweeping around a reference level, and a reference level acquired by applying the determined offset is set for each data sampler and each swing detection sampler. The reference generator 30 generates a signal for performing sweeping around a reference level and provides the signal to the data samplers and the swing detection samplers. The offset calibration logic 40 determines offsets and provides the reference generator 30 with information on the reference levels acquired by applying the offsets.

This operation will be described in detail with reference to the configuration example of FIG. 8. An input SAMP_IN of all the samplers is connected to an output EQ_OUT of an equalizer circuit when the receiver performs actual data recovery (configured is a switch for disconnecting connection to a channel if an equalizer, such as a CTLE, is not required). During offset calibration, the switch breaks connection between the output EQ_OUT and the input SAMP_IN. Instead, an output REF_SAMP_IN of the reference generator 30 is provided to an input node of a first sampler (a sampler of which a reference level is $E_H$ and hereinafter referred to as an "$E_H$ sampler"). An input level of the sampler is set to a value the same as $E_H$ through the output REF_SAMP_IN, and then by sweeping the $E_H$ level originally applied as a reference level of the sampler, an offset is detected depending on how far the threshold level at which the output of the sampler changes from 0 to 1 is from an ideal $E_H$ level (in the present disclosure, the expression "detection of an offset" includes direct detection of a reference level acquired by applying an offset). The same processes are sequentially performed while a value of the output REF_SAMP_IN is changed to a value the same as a desired reference level of each sampler, so that all offsets of the $D_H$, $D_M$, $D_L$, $E_L$ samplers are detected. This sequential operation is controlled through the offset calibration logic. Further, instead of sequential operation, parallel operation may be performed by providing as many reference generators and offset calibration logics as there are samplers.

The operation and configuration for offset calibration are not necessarily limited to the above description and may be embodied in various forms. However, in performing offset calibration of the samplers, it is important that an offset is detected by sweeping, with a data input matched to each reference level, the reference level around the data input, not by sweeping a reference level around 0 with an input of a sampler set to 0.

After the offsets are detected, the reference levels $E_H$, $D_H$, $D_M$, $D_L$, and $E_L$ are updated with values acquired by applying the values of the detected offsets and the resulting reference levels are fixed at step S14. After the receiver is ready to receive PAM-4 data, the transmitter transmits a signal including actual data (namely, transmission information).

When actual data is received, while a PAM-4 signal is received, adaptation of a gain value is performed so that the gain of the variable gain amplifier 70 is adjusted and a data swing at a sampler input is matched to fixed reference levels predetermined. This is divided into steps as follows.

First, when the receiver receives a signal including transmission information through a channel, the variable gain amplifier 70 performs a signal amplification step S16 in which the signal is amplified.

The receiver performs a swing detection step S18 in which a swing of the signal amplified at the signal amplification step is detected using the one or multiple swing detection samplers of the swing detection sampler block 20. The adaptation logic 50 identifies the output value of the swing detection sampler block 20 and detects whether the current data swing is larger than the set reference level $E_H$ or smaller than the set reference level $E_L$.

In order to make a swing of a signal input to the data samplers uniform, a feedback control step S20 is performed in which an amplification factor amplified at the signal amplification step is controlled according to the swing detected at the swing detection step. The adaptation logic 50 controls the variable gain amplifier 70 so that a gain value of variable gain amplifier 70 is decreased or increased depending on the current data swing is larger than the set reference level $E_H$ or smaller than the set reference level $E_L$. By repeatedly performing the steps S16 to S20, the output values of the swing detection samplers may be made to follow at 0.5 (between 0 and 1). Accordingly, a signal having a swing matched to the reference levels preset at step S10 is input to the data samplers.

Figure 7:
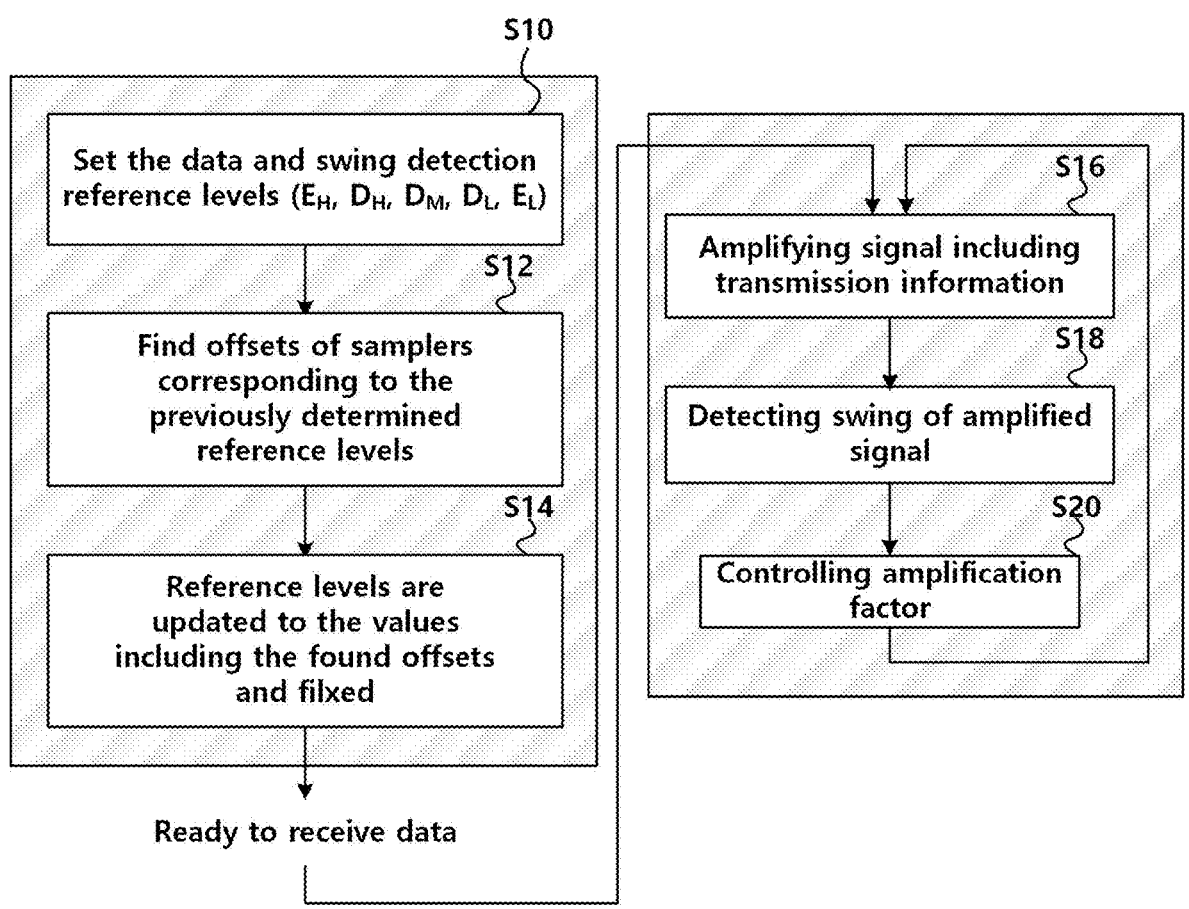
FIG. 7 is an operation flowchart according to the first exemplary embodiment of the present disclosure.

In the meantime, in parallel with repeatedly performing the steps S16 to S20 as described above, the levels of the signal amplified at the signal amplification step are distinguished using the multiple data samplers of the data sampler block 10 (not shown in FIG. 7). During reception of a signal including transmission information, the reference levels for the multiple data samplers and swing detection samplers are fixed.

For reference, in the examples of FIGS. 6 to 8, it is illustrated that the swing detection block use two swing detection samplers ($E_H$ and $E_L$), but only one of the two swing detection samplers ($E_H$ and $E_L$) may be used so as to improve bandwidth, etc.

As described above, in the present disclosure, since data and swing detection reference levels that are predetermined and fixed are used, the reference levels do not change during data swing adaptation. Therefore, there is no offset cancelling error (see the above description with reference to FIGS. 4A and 4B) that may occur because the reference levels when offsets of samplers are extracted and the reference levels under a condition in which the samplers actually operate are different in value.

Figure 10:
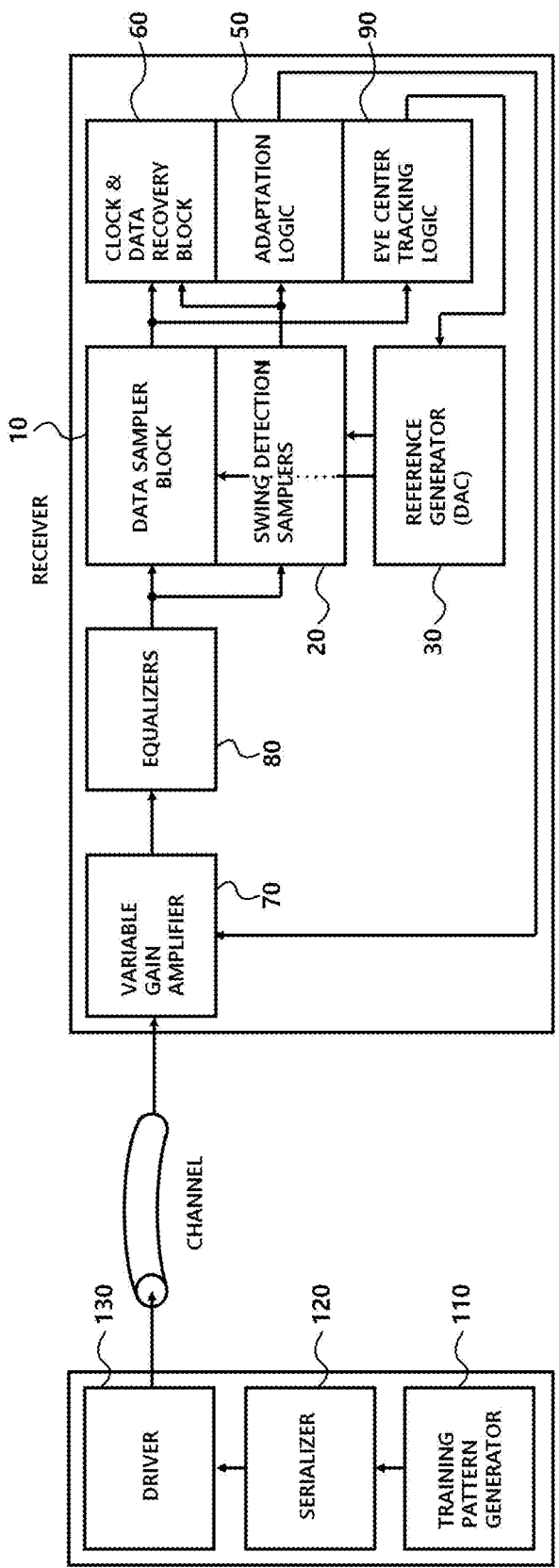
FIG. 10 is a block diagram illustrating a receiver according to a second exemplary embodiment of the present disclosure.

An adaptive receiver and an adaptive receiving method according to a second exemplary embodiment of the present disclosure will be described with reference to FIGS. 10 to 13. FIG. 10 is a block diagram illustrating a receiver according to the second exemplary embodiment of the present disclosure. Hereinafter, descriptions of the matters that are the same as or similar to those of the first exemplary embodiment of the present disclosure will be omitted.

Figure 11A:
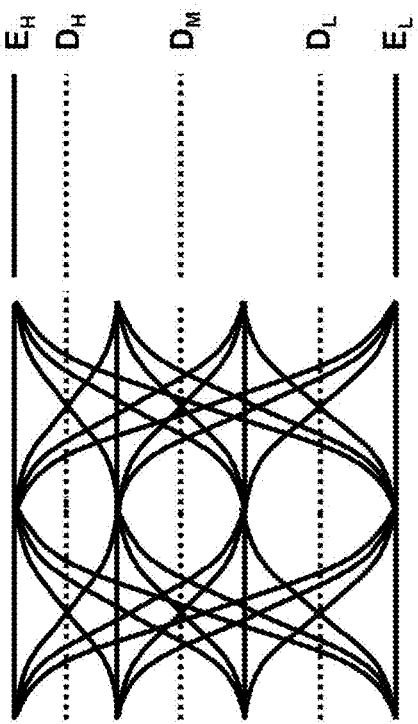
FIGS. 11A and 11B are diagrams illustrating the impact of PAM-4 non-linearity.

In the present disclosure using fixed reference levels, how to initially determine the fixed reference levels may be an important issue. As shown in FIG. 11A, it is ideal to reach an input of a sampler while the linearity of a PAM-4 signal is kept good. However, as shown in FIG. 11B, in practice, there is a possibility that a signal having the breakdown of linearity is received because of non-linearity of an analog front-end circuit for a driver of a transmitter and a receiver.

Figure 11B:
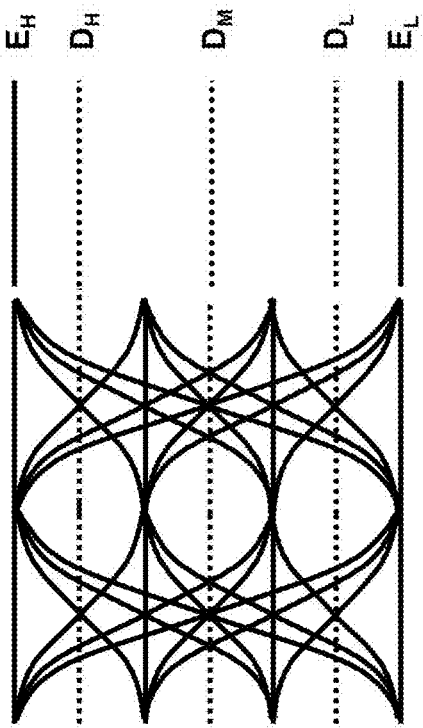

For robust operation, even in the case of FIG. 11B, appropriate data reference levels $D_H$, $D_M$, and $D_L$ need to be set, but it is impossible to identify in advance the shape of a PAM-4 eye of a signal to be received as an input of a sampler.

For reference, the case in which a signal having the breakdown of linearity is received in as shown in FIG. 11B may be a problem also in the related art in which data reference levels are determined in the form of Eq.1/Eq.2 assuming that linearity is good.

There may be a method of setting data reference levels themselves adapted, in the case in which a signal having the breakdown of linearity is received. However, when data is not received in a pattern identified in advance (generally, a receiver is unable to identify data to be received in advance), it is very difficult to keep tracking a data level through adaptation.

According to the second exemplary embodiment of the present disclosure, provided is a method of finding data reference levels first through a training process in which the transmitter and the receiver transmit and receive a predetermined pattern therebetween, and of determining fixed reference levels. The second exemplary embodiment is a configuration and a method acquired by adding such training to those of the first exemplary embodiment. Compared to FIG. 5, in particular, the transmitter further includes a training pattern generator 110, and the receiver further includes eye center tracking logic 90.

In order to align the reference levels of the multiple data samplers of the data sampler block 10 with the eye centers of a reception signal, the eye center tracking logic 90 controls the reference generator 30 before the transmitter transmits a signal including transmission information. The training pattern generator 110 of the transmitter generates a training pattern, a serializer 120 of the transmitter serializes the pattern, and a driver 130 of the transmitter transmits the resulting pattern through a channel.

Figure 12A:
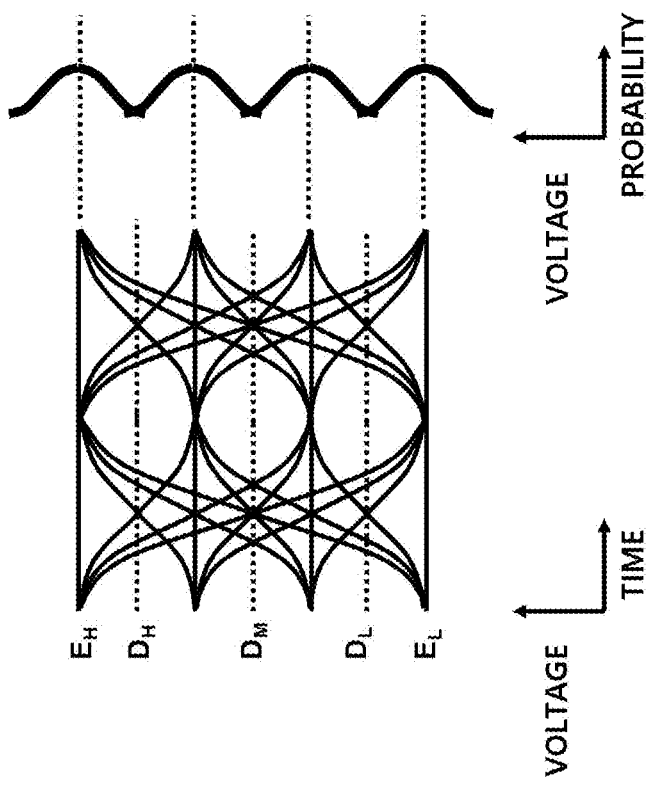
FIGS. 12A and 12B are diagrams illustrating an example of training according to the second exemplary embodiment of the present disclosure.
Figure 12B:
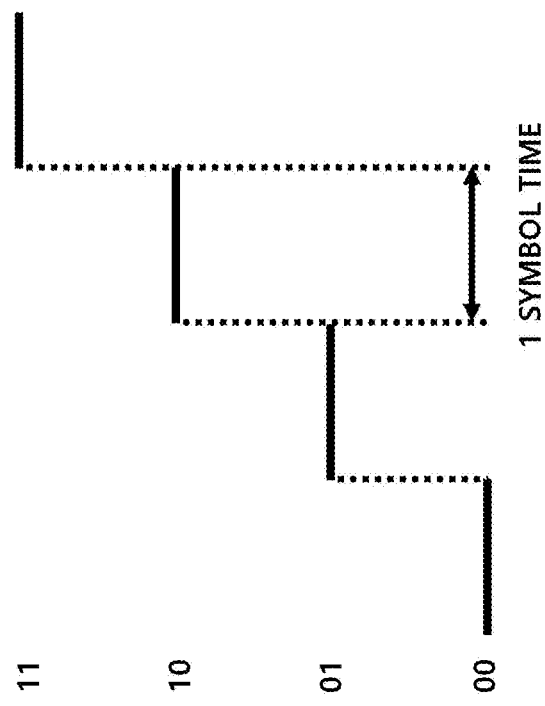

FIGS. 12A and 12B are diagrams illustrating an example of training. As a training pattern, as shown in FIG. 12A, a pattern that repeatedly generates symbols corresponding to data 00→01→10→11 may be used. The characteristic of the pattern is that the probabilities of occurrence of the symbols corresponding to 00, 01, 10, and 11 are the same. The eye center tracking logic 90 uses the characteristic of the data pattern to perform an operation of finding the optimum reference levels of three eyes. FIG. 12B illustrates a PAM-4 eye diagram for a training pattern viewed from a sampler input, and the probability distribution of each symbol level. When an actual receiver chip operates, each symbol level includes Gaussian noise, so the probability considering this noise factor is shown. The eye tracking logic 90 may find the eye center levels through the following principle, for example.

As described above, the training pattern ensures that all symbols are present with the same probability. Therefore, as shown in FIG. 12B, in the $D_H$ sampler, when the reference level is $D_H$, the probability of outputting 0 as the output of the sampler is exactly three times as high as the probability of outputting 1. Therefore, while the outputs of the $D_H$ sampler are accumulated and monitored, when the output value is higher than 0.25 on average, the reference level is made to increase, and conversely when the output value is lower, the reference level is made to decrease, thereby finding the optimum eye center level. In the same manner, in the case of the $D_M$ sampler, the reference level is adjusted so that the average value is 0.5. In the case of the $D_L$ sampler, the reference level is adjusted so that the average value is 0.75.

Accordingly, all the optimum reference levels of the three eyes are found. For reference, the reference levels converged at through this tracking method inherently converge at a value including the offset of the sampler, so offset calibration is not required. Therefore, in this embodiment, offset calibration of only the $E_H$ and $E_L$ samplers are required. Through this operation, even when a signal having the breakdown of linearity of a PAM-4 eye is received, appropriate data reference levels may be found.

Figure 13:
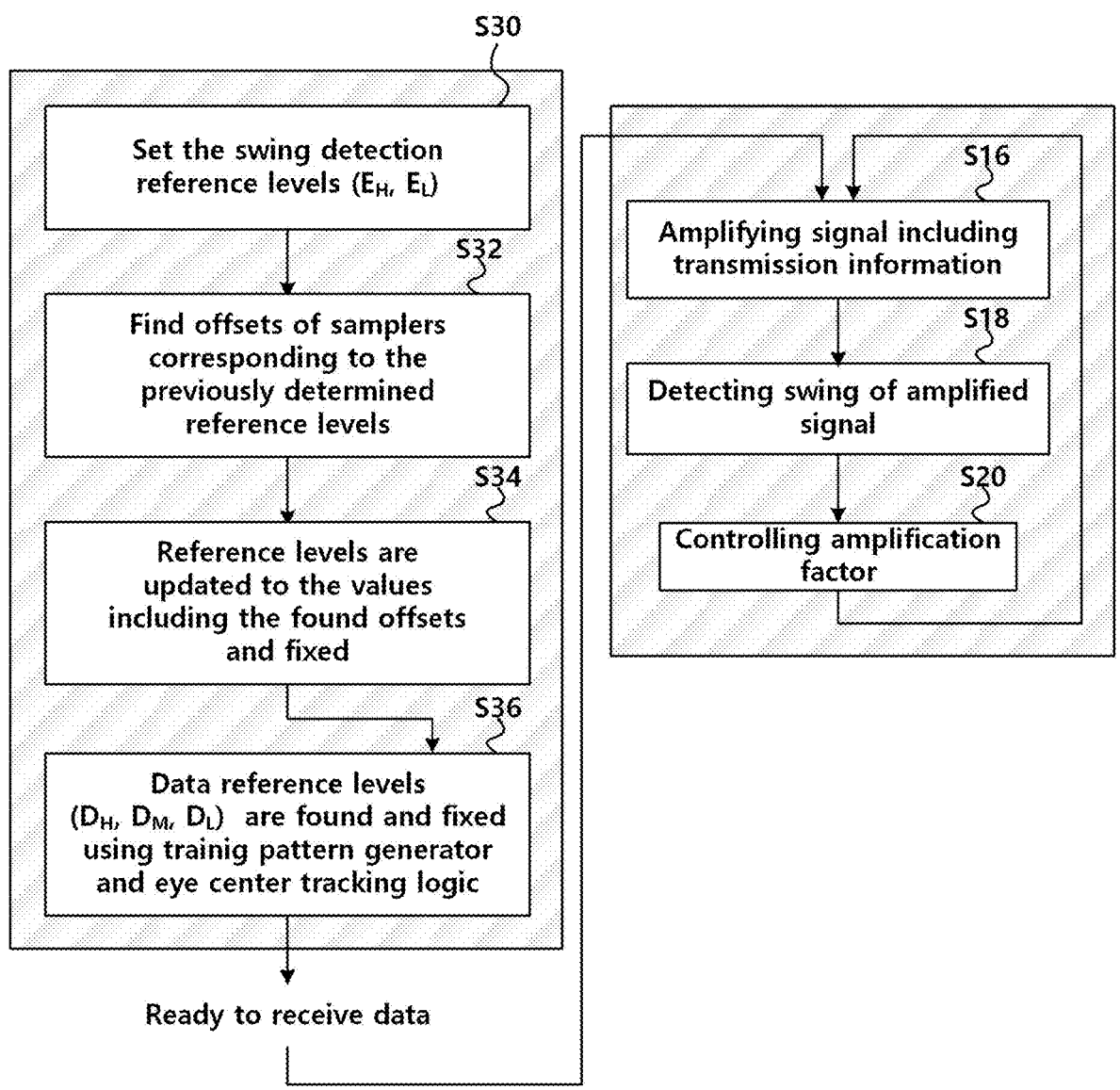
FIG. 13 is a flowchart illustrating a conceptual operation according to the second exemplary embodiment of the present disclosure.

FIG. 13 is an operation flowchart illustrating an adaptive receiving method according to the second exemplary embodiment of the present disclosure. As described above, since in the method according to the second exemplary embodiment, offset calibration of only the $E_H$ and $E_L$ samplers is required, as in the first exemplary embodiment, the reference levels $E_H$ and $E_L$ corresponding to the $E_H$ and $E_L$ samplers are determined first according to a desired data swing at step S30. Next, under the condition of the determined reference level, the offset values are found through the offset calibration logic (not shown in FIG. 10) described with reference to FIG. 8, at step S32. The reference levels of the swing detection samplers are updated with the values including the offsets and the resulting reference levels are fixed at step S34.

In order to align the reference levels of the multiple data samplers with the eye centers of a reception signal, data reference levels $D_H$, $D_M$, and $D_L$ are determined using the training pattern generator 110 and the eye center tracking logic 90 and fixed at step S36. Before the transmitter transmits a signal including transmission information, when the transmitter transmits a training pattern, a process of determining the eye centers of the reception signal by using a result received by each of the multiple data samplers is performed, and a process of providing the reference levels of the multiple data samplers according to the determined eye centers is performed.

In more detail, after the reference levels of the $E_H$ and $E_L$ samplers are fixed, a training sequence of PAM-4 data is performed. In the transmitter, a training pattern prepared in advance is generated, and in the receiver, gain is adjusted first through the adaptation logic 50 and the variable gain amplifier 70 so as to be matched with the data swing ($E_H$ and $E_L$ levels) set as described above (not shown in FIG. 13). Using the eye center tracking logic 90, the data reference levels are tracked and fixed as described above with reference to FIGS. 12A and 12B. The following processes are repeated: when a cumulative average output value of each data sampler is higher than an expected output value, the reference level is increased and when it is lower than the expected output value, the reference level is decreased. Accordingly, the eye centers of the reception signal are determined. Information on the determined eye centers is provided to the reference generator 30.

Although it is described that the gain of the variable gain amplifier 70 is adjusted to match the swing and the data reference levels are tracked in a sequential manner, the two operations may be simultaneously performed. However, in this case, it is necessary to appropriately set bandwidths of the respective adaptation loops different so that there is no problem with the gain and the convergence of reference levels due to a collision between two loops. After adaptation of the data reference levels is completed in this way, it is ready to receive PAM-4 data to be actually transmitted by the transmitter.

As described above with reference to FIGS. 12A and 12B, it is easily found that the method of tracking the data reference levels by using the probability distribution of a data pattern identified in advance cannot be used when any actual PAM-4 data is received. Therefore, when actual PAM-4 data is received, only data swing adaptation is kept being performed through the variable gain amplifier similarly to the first exemplary embodiment. Regarding the data reference levels, appropriate values are found through the eye center tracking logic 90 and are then fixed for use.

Receiving actual data is performed almost similarly to the steps S16 to S20 of the first exemplary embodiment, which is in detail as follows. First, when the receiver receives a signal including transmission information through a channel, the variable gain amplifier 70 performs a signal amplification step S16 in which the signal is amplified. The receiver performs a swing detection step S18 in which a swing of the signal amplified at the signal amplification step is detected using the one or multiple swing detection samplers of the swing detection sampler block 20. In order to make a swing of a signal input to the data samplers uniform, a feedback control step S20 is performed in which an amplification factor amplified at the signal amplification step is controlled according to the swing detected at the swing detection step. In the meantime, in parallel with repeatedly performing the steps S16 to S20 as described above, the levels of the signal amplified at the signal amplification step are detected using the multiple data samplers of the data sampler block 10.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. An adaptive receiving method performed in a receiver for receiving a multi-level signal, wherein the receiver includes multiple data samplers, the adaptive receiving method comprising:
    receiving the multi-level signal through a channel, wherein the multi-level signal includes transmission information;
    amplifying, at a signal amplification step, the multi-level signal;
    inputting the amplified multi-level signal to the multiple data samplers;
    detecting, at a swing detection step, a swing of the amplified multi-level signal, by using one or more swing detection samplers;
    controlling, at a feedback control step according to the detected swing, an amplification factor applied at the signal amplification step, in order to make the swing of the amplified multi-level signal input to the multiple data samplers uniform,
    wherein while the signal amplification, swing detection and feedback control steps are repeatedly performed, levels of the amplified multi-level signal are distinguished using the multiple data samplers.

2. The adaptive receiving method of claim 1, wherein during reception of the multi-level signal including the transmission information, reference levels for the multiple data samplers and the one or more swing detection samplers are fixed.

3. The adaptive receiving method of claim 1, further comprising:
    calibrating, at an offset calibration step, offsets of the multiple data samplers and the one or more swing detection samplers before the multi-level signal including the transmission information is received.

4. The adaptive receiving method of claim 3, wherein at the offset calibration step, in each of the multiple data samplers and the one or more swing detection samplers, the offset is determined using a signal for performing sweeping around a first reference level, and a second reference level acquired by applying the determined offset is set for each of the multiple data samplers and the one or more swing detection samplers.

5. The adaptive receiving method of claim 1, further comprising:
    aligning, at an eye center tracking step, reference levels of the multiple data samplers with eye centers of a reception signal.

6. The adaptive receiving method of claim 5, wherein the eye center tracking step is performed before a transmitter transmits the multi-level signal including the transmission information, and
    the eye center tracking step comprises:
    an eye center determining process in which when the transmitter transmits a training pattern, the eye centers of the reception signal are determined using a result received by each of the multiple data samplers; and
    a reference level providing process in which the reference levels of the multiple data samplers are provided according to the determined eye centers.

7. The adaptive receiving method of claim 6, wherein in the training pattern, all symbols are present with a same probability, and
in the eye center determining process, the following is repeated: when a cumulative average output value of each of the multiple data samplers is higher than a predicted output value, the reference level is increased and when the cumulative average output value is lower than the predicted output value, the reference level is decreased.

8. An adaptive receiver for multi-level signaling, the adaptive receiver comprising:
a variable gain amplifier configured to amplify a multi-level signal including transmission information, the multi-level signal being received through a channel;
a data sampler block including multiple data samplers configured to classify levels of the amplified multi-level signal;
a swing detection sampler block including one or more swing detection samplers configured to detect a swing of the amplified multi-level signal; and
adaptation logic configured to control gain of the variable gain amplifier by using an output of the swing detection sampler block, in order to make the swing of the multi-level signal input to the data sampler block uniform.

9. The adaptive receiver of claim 8, further comprising:
a reference generator configured to output reference levels for the multiple data samplers and the one or more swing detection samplers.

10. The adaptive receiver of claim 9, wherein the reference levels output by the reference generator are fixed during reception of the multi-level signal including the transmission information.

11. The adaptive receiver of claim 9, further comprising:
offset calibration logic configured to provide information on the reference levels to a reference generator and to performing offset calibration on the reference levels,
wherein in a process of performing the offset calibration, the reference generator generates a signal for performing sweeping around the reference levels and provides the signal for performing sweeping to the multiple data samplers and the one or more swing detection samplers, and the offset calibration logic determines offsets and provides the reference generator with information on the reference levels acquired by applying the offsets to the reference levels.

12. The adaptive receiver of claim 8, wherein the variable gain amplifier is realized as a differential amplifier having a source degeneration resistor, and
the gain of the variable gain amplifier is controlled by varying resistance of the source degeneration resistor.

13. The adaptive receiver of claim 9, further comprising:
eye center tracking logic configured to control the reference generator in order to align the reference levels of the multiple data samplers with eye centers of a reception signal.

14. The adaptive receiver of claim 13, wherein when a transmitter transmits a training pattern before transmitting the multi-level signal including the transmission information, the eye center tracking logic determines the eye centers of the reception signal by using a result received by each of the multiple data samplers and provides information on the determined eye centers to the reference generator.

* * * * *